United States Patent [19]

Gurolnick

[11] E Patent Number: Re. 32,806

[45] Reissued Date of Patent: Dec. 27, 1988

[54] SINK MOUNTED BATHING DEVICE

[76] Inventor: Richard C. Gurolnick, Arlington Heights, Ill.

[21] Appl. No.: 885,521

[22] Filed: Jul. 14, 1986

Related U.S. Patent Documents

Reissue of:

[64] Patent No.: 4,216,552
Issued: Aug. 12, 1980
Appl. No.: 3,342
Filed: Jan. 25, 1979

U.S. Applications:

[63] Continuation of Ser. No. 370,690, Apr. 22, 1982.

[51] Int. Cl.[4] ..... A47K 3/024

[52] U.S. Cl. ..... 4/572; 4/584

[58] Field of Search ..... 4/539, 572, 553, 589, 4/584, 590, 656, 659; D23/52, 54, 60

[56] References Cited

U.S. PATENT DOCUMENTS

| | | | |
|---|---|---|---|
| D. 188,838 | 9/1960 | Johnson | 4/572 X |
| D. 191,193 | 8/1961 | O'Brien et al. | D23/52 |
| D. 205,992 | 10/1966 | Gardner | D23/52 |
| 1,512,068 | 10/1924 | Thornburg | D23/52 X |
| 1,717,441 | 6/1929 | Engel | 4/553 |
| 2,323,454 | 7/1943 | Chambers | 4/657 |
| 2,548,301 | 4/1951 | Gibson | 4/553 |
| 2,854,671 | 10/1958 | Setecka | 4/539 |
| 2,957,184 | 10/1960 | Smith | 4/590 |
| 2,973,889 | 3/1961 | Phillips | 4/572 X |
| 3,545,016 | 12/1970 | Schorken | 4/572 |

FOREIGN PATENT DOCUMENTS

| | | | |
|---|---|---|---|
| 1236955 | 6/1960 | France . | |
| 1439625 | 7/1965 | France | 4/570 |

*Primary Examiner*—Charles E. Phillips
*Attorney, Agent, or Firm*—George J. Netter

[57] ABSTRACT

An infant bathing device having the undersurface thereof contoured for being removably received in resting position on a double sink, the device having a first trough portion configured and contoured for receiving the body of the infant, the first trough portion adjacent one end of the device having an upwardly extending back and head supporting portion extending above the highest point of the first trough portion. The device includes a second shallower trough portion adjacent the other end thereof for receiving bathing articles such as soap and the like. Intermediate the two trough portions is an overflow divider spaced below the upper periphery of the main body of the device, the divider having the undersurface thereof configured for resting on the divider of a double kitchen sink with the back and head supporting portion abutting one end of the sink. The back supporting portion may optionally be provided with handle means with the entire device being formed in an integral unit.

9 Claims, 2 Drawing Sheets

SINK MOUNTED BATHING DEVICE

Matter enclosed in heavy brackets [ ] appears in the original patent but forms no part of this reissue specification; matter printed in italics indicates the additions made by reissue.

*This is a continuation of application Ser. No. 06/370,690, filed Apr. 22, 1982.*

BACKGROUND OF THE INVENTION

The background of the invention will be discussed in two parts:

1. Field of the Invention

This invention relates to bathing devices, and more particularly to a contoured infant bathing device for sink mounting.

2. Description of the Prior Art

In the bathing of infants, the kitchen sink is oftentimes employed as the "bathtub," or alternatively, a baby bathtub formed of plastic may be employed, such baby bathtubs ordinarily taking the form of an elongated or oval shaped basin. In either event, with the natural curiousity of the infant and the inordinate amount of infant activity such as moving around, or reaching for objects, a person bathing an infant is generally required to devote full attention to the task at hand, and more often than not, with one hand adjacent the infant's back or head to suitably restrain the infant during bathing. Should any articles of bathing, such as baby shampoo, soap or the like be out of reach of the person, usually assistance is required from another person to obtain the required bathing articles. Mishaps of a minor nature are frequently encountered while bathing an infant in a sink or a bathtub, such instances to the infant usually being more traumatic than physically damaging. For example, with activity of the infant, the infant's body when the person's hand is soapy, may slip thereby resulting in a "dunking" or minor bump or the like.

It is an object of the present invention to provide a new and improved infant bathing device.

It is another object of the present invention to provide a new and improved infant bathing device having a trough portion thereof configured and contoured for generally restraining the body of the baby in a somewhat natural position.

It is a further object of the present invention to provide a new and improved infant bathing device having portions thereof configured and contoured for elevating the feet slightly above the buttocks with the back and head portion of the infant resting on a support portion.

It is still another object of the present invention to provide a new and improved infant bathing device configured for mounting on a double sink.

SUMMARY OF THE INVENTION

The foregoing and other objects of the invention are accomplished by providing a unitary infant bathing device having a first trough portion configured and contoured for receiving the body of the infant, one end of the trough portion having an upwardly extending back and head supporting portion with the other end of the trough portion having a slightly elevated leg resting portion. A second trough portion of shallower dimension is positioned adjacent the other end of the device with an interconnecting overflow divider between the two trough portions. The divider has the upper surface thereof disposed below a peripheral flange for maintaining the fluid level in the first trough portion to a height generally equal to the divider height. The second trough portion is provided with an overflow drain with the second trough portion being configured for receiving bathing articles such as soap, shampoo and the like. The undersurface of the divider portion is configured for resting on the divider of a double sink with the support portion resting against the other end of the sink. The support portion is provided with a downwardly extending handle for enabling the device to be suspended for drying purposes.

Other objects, features and advantages of the invention will become apparent from a reading of the specification when taken in conjunction with the drawings in which like referenced numerals refer to like elements in the several views.

DESCRIPTION OF THE PREFERRED EMBODIMENT

Figure 1:
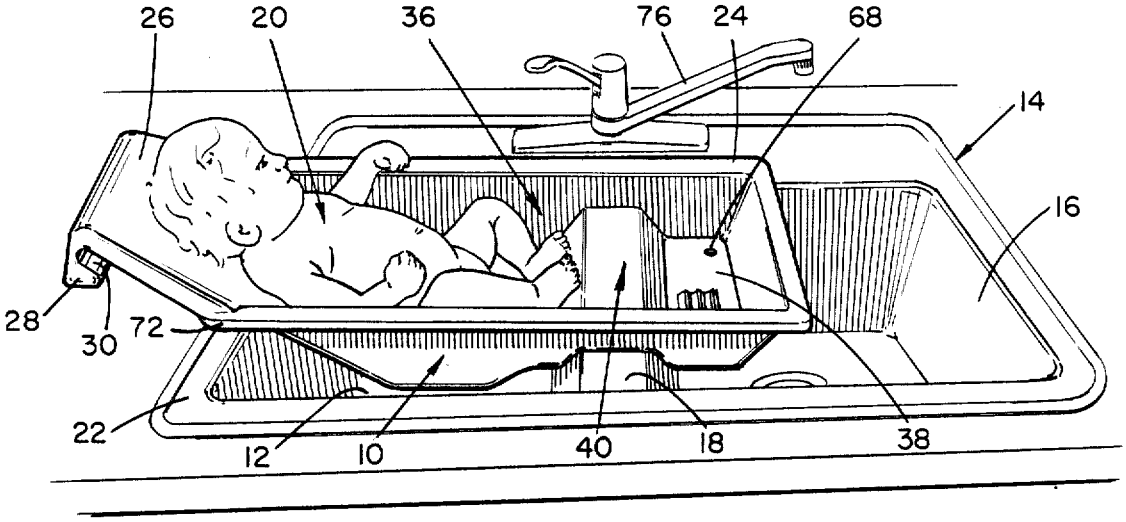
FIG. 1 is a perspective view of the infant bathing device according to the invention with the device resting on a double sink with an infant within the device.

Referring now to the drawings and particularly to FIG. 1, there is shown a bathing device generally designated 10 with the main portion thereof suspended within one basin 12 of a double sink generally designated 14, the double sink 14 being of the configuration normally found in newer homes. The double sink 14 includes a first basin 12 and a second basin 16, the basins 12 and 16 generally being identically configured and separated by a generally centrally disposed partition 18 which usually has a planar upper surface, or slightly rounded, with the upper surface being slightly recessed from the plane of the opening of the sink 14.

As shown in mounted position in FIG. 1, the infant bathing device 10 sets within one of the basins, basin 12, for example, with an infant 20 positioned within the device 10. As will hereinafter be described, the device 10 is configured and contoured for being received in resting position on structural portions of the sink 14, such as one edge 22 and the partition 18 which define opposite sides of the basin 12.

Figure 2:
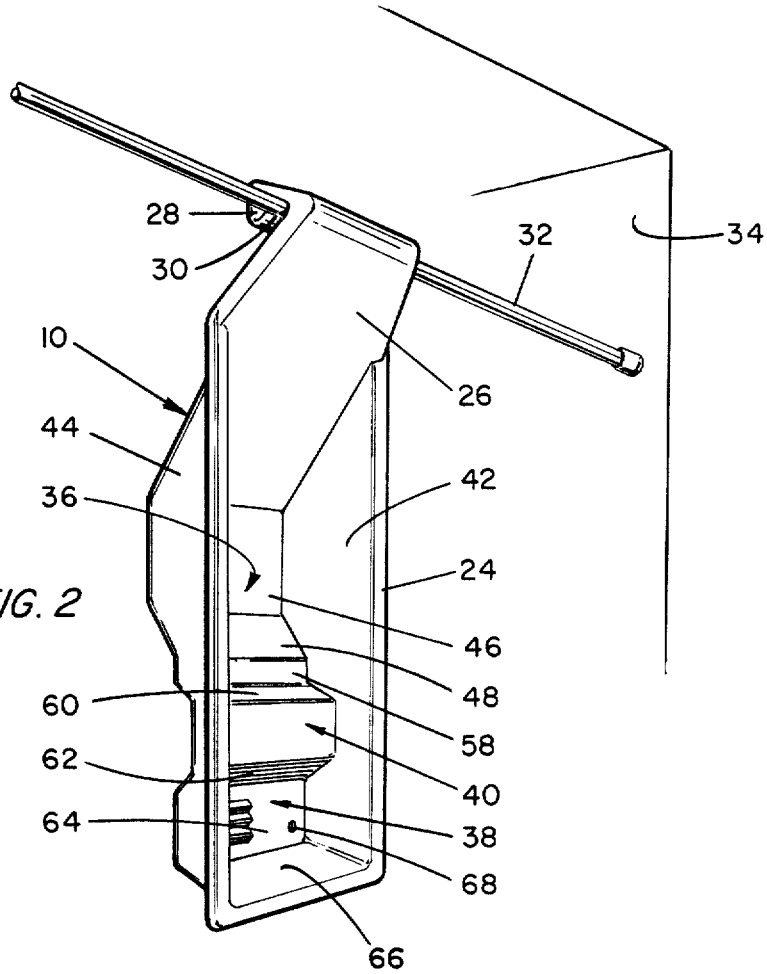
FIG. 2 is a perspective view of the infant bathing device suspended in a storage position.

Referring also to FIGS. 2–5, the device 10 is provided with a peripheral ridge portion 24, all points of which generally define a plane with an upwardly extending back and head supporting portion inclined angularly upwardly and outwardly relative to the ridge 24 with the terminal end of the supporting portion 26 being formed downwardly and inwardly to define a handle 28 with a transversely extending recess 30 formed on the undersurface thereof, the recess 30 being suitably configured for suspending the device 10 from a towel rack or shower curtain rod 32 in a shower stall 34 (FIG. 2).

The ridge 24 generally rectangular with the interior of the device 10 being divided within this rectangular perimeter into a first trough portion generally designated 36 and a second trough portion generally designated 38, each of the trough portions 36 and 38 being suitably separated by an intervening overflow divider portion generally designated 40.

The device is provided with first and second side walls 42 and 44 which are downwardly extending from the ridge portion 24 and generally perpendicular or slightly inwardly inclined relative to each other and relative to the ridge 24. The first trough portion 36 is defined by a bottom portion intersecting the planes of the first and second side walls 42 and 44 and intersecting the plane of the supporting portion 26 with the bottom 46 being generally parallel to the plane of the opening defined by ridge 24. At the end opposite the intersection of the bottom portion 46 and the supporting portion 26, an angularly disposed front wall 48 extends upwardly in upwardly diverging relation relative to the plane of the supporting portion 26 with the front wall 48 then terminating in a ledge 58 generally parallel to the plane of ridge 24. From the ledge portion 58 the contour of the inner bottom surface continues upwardly at an angle relative thereto to form a first side 60 of the divider portion, the top surface of which is generally parallel to the plane of the opening defined by ridge 24. The second side 62 of divider portion 40 then angles downwardly to the bottom surface 64 of the second trough 38, the bottom 64 being generally parallel to the plane of the opening defined by ridge 24. The second trough portion 38 is defined by the bottom 64, the second side 62 of the divider portion 40, the adjacent surfaces of the first and second side walls 42 and 44 respectively, and an end wall 66 of the device 10, the end wall 66 being slightly angularly inclined relative to the plane of the ridge portion 24.

Figure 3:
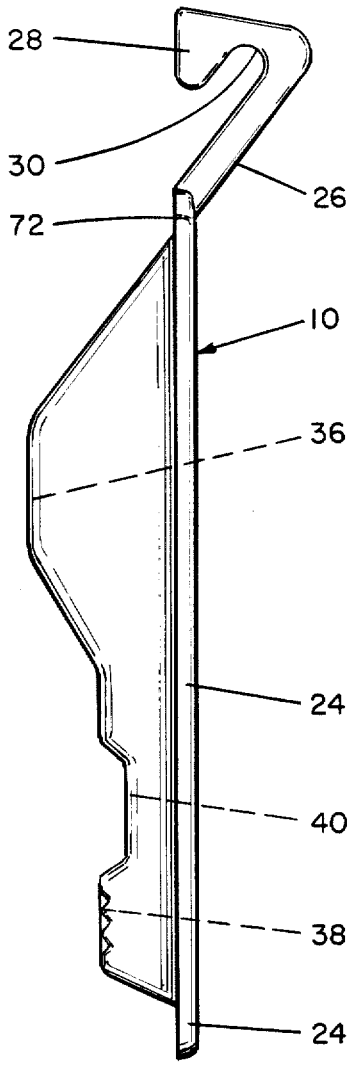
FIG. 3 is a side elevational view of the infant bathing device of FIG. 1.
Figure 4:
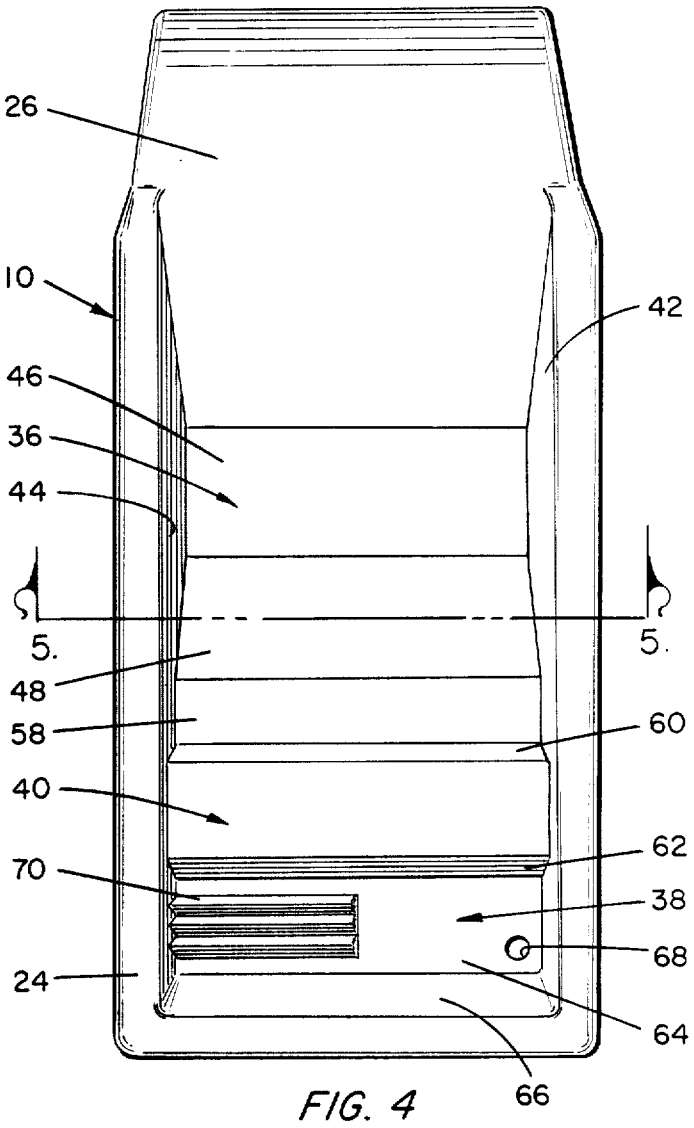
FIG. 4 is a plan view of the infant bathing device.
Figure 5:
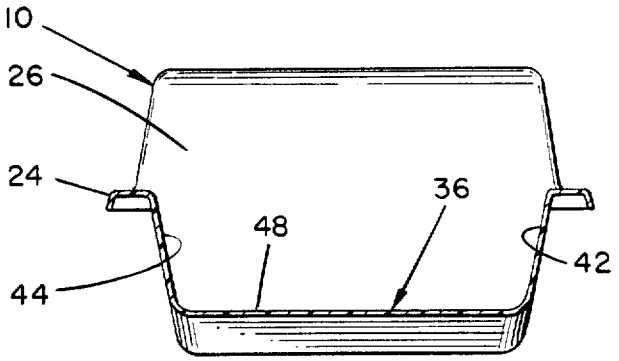
FIG. 5 is a cross-sectional view taken generally along line 5—5 of FIG. 4.

As can be seen from the drawings and particularly FIG. 3, the first trough portion 36 has a depth sufficient for receiving the infant 20 therein for bathing purposes while the second trough portion 38 is shallower in depth for retaining suitable bathing articles such as soap, shampoo and the like. The upper surface of the divider portion 40 is recessed from and generally parallel to the plane of the ridge 24 to provide an overflow of water from the first trough portion 36 to the second trough portion 38, this overflow then being discharged through an aperture 68 formed in the bottom 64 of the second trough portion 38. The bottom 64 may also be provided with a plurality of ridge-like projections 70 extending upwardly therefrom for assisting in retaining soap for example.

As illustrated in the drawings, the ridge portion 24 is essentially a flange extending outwardly from the side walls 42 and 44 and, as specifically illustrated in FIG. 3, the ridge 24 extends outwardly beyond the surface of the head and back supporting portion 26 to define a lip 72 on the undersurface thereof for resting on the edge 22 of the sink 14 (see FIG. 1). The spacing between the undersurface of the ridge 24 and the undersurface of the divider portion 40 is selected to generally coincide with the distance between the upper surface of the partition 18 and the plane of the opening of the sink 24 so that the infant bathing device 10 has the plane of the ridge portion 24 generally horizontal when mounted as shown in FIG. 1. The device 10 is a unitary device, formed, for example, from linear polyethylene plastic. The second trough portion 38 is essentially a utility tray with the dimensions of the trough portions selected to control the water level within the first trough portion 36 to a depth of approximately 2.75 inches. In use, the device 10 is mounted in resting engagement on the sink 14 as shown in FIG. 1 with the lip portion 72 resting on the edge 22 of one basin 12 of the sink 14 with the generally horizontal surface of the divider portion 40 resting on the upper surface of partition 18, with the dimensions being so selected that, in this position, the ridge 24 lies in a plane generally parallel to the plane of the sink 14. After setting the device 10 within the basin 12 as illustrated, the articles of bathing such as soap and shampoo, washcloths and the like may be placed in the utility tray or second trough 38 for easy access by the adult. Water at the proper temperature is then discharged into the first trough portion 36 by means of the handy faucet assembly 76 filling to a maximum level consistent with the overflow level of the horizontal surface of the divider portion 40, any overflow thus being discharged through the outlet drain 68. With the infant 20 in position as shown in FIG. 1, any water displaced by the infant 20 will likewise be discharged through the outlet drain 68.

As can be seen in FIG. 1, the infant 20 is positioned in a relatively normal position for bathing with the back and head resting in an inclined position along the plane of the supporting portion 26 with the buttocks of the child resting on the bottom 46 of the first trough portion 36. In this position, the heels of the child are resting on the ledge 58 with the feet bottom comfortably resting against the first side 60 of the divider portion 40. The spacing between the side walls 42 and 44, in conjunction with the inclination of the opposite sides of the first trough portion 36 suitably restrain the infant 20 while providing sufficient spacing on both sides of the infant 20 for bathing purposes. With the utility tray provided by the second trough portion 38, the adult has access to all things required for bathing the infant 20. After the bathing, the infant 20 can be suitably attended to and the device 10 cleaned out by use of the faucet 76 of the sink 14. The handle 28 with the adjacent recess 30 then enables the device 10 to be suspended for storage or drying on either a towel rack or a shower curtain rod 32 as illustrated in FIG. 2.

While there has been shown and described a preferred embodiment it is to be understood that various other adaptations and modifications may be made within the spirit and scope of the invention.

What is claimed is:

1. A unitary device for infant bathing, said device being configured for use on a double basin kitchen sink having a raised partition between the basins; said device comprising:

substantially peripheral ridge means defining a top opening;

a first trough portion generally configured and contoured for receiving the body of an infant therein, said first trough portion including an upwardly extending back and head supporting surface extending above the plane of said opening;

a second trough portion adjacent the end of said device opposite said supporting surface, said second trough portion having a shallower depth than said first trough portion; and a divider portion between said first and second trough portions, one end of said ridge means and the undersurface of said divider portion adjacent said back and head supporting surface being configured and dimensioned for setting said device over a double basin sink with said one end of the ridge means resting on an edge region of the sink and the undersurface at the divider portion resting on and being retained in position by the partition of said sink; said first trough portion includes horizontally disposed ledge means mating, with said divider portion generally opposite said supporting surface and configured for enabling the feet of the infant to rest thereon.

2. The combination according to claim 1 wherein said divider portion has an upper surface thereof spaced from the plane of said opening for permitting water in said first trough portion to overflow into said second trough portion.

3. The combination according to claim 2, wherein said second trough portion includes drain means for permitting water therein to drain into the sink.

4. The combination according to claim 3 wherein said supporting surface includes handle means on the undersurface thereof adjacent the end thereof.

5. The combination according to claim 4 wherein said ridge means is a substantially peripheral outwardly extending flange configured for providing rigidity to said device.

6. The combination according to claim 5 wherein said device is formed from a linear polyethylene plastic composition.

7. The combination according to claim 4 wherein said supporting surface is generally planar.

8. The combination according to claim 7 wherein said second trough portion is provided with means for retaining accessory bathing articles.

*9. An infant bathing device generally configured for use in a double basin kitchen sink having a raised partition between the basins, comprising:*

*ridge means defining a top opening;*

*a first trough portion for receiving the infant therein, said first trough portion including an uppermost part including an upwardly extending back and head supporting surface extending above the general plane of said top opening;*

*a second trough portion;*

*a divider portion located between the first and second trough portions and having an upper substantially horizontal surface and an outwardly directed surface substantially parallel to the general plane of said top opening for being received on the upper edge of the sink partition, said divider portion further including first and second spaced apart side walls angularly intersecting said outwardly directed surface each for extending into a respective sink basin at each side of the partition to prevent translation of the bathing device in a direction transversely of the partition;*

*the inner wall surface of the divider portion first side wall being integrally joined with the first trough portion and serving as a footrest for the infant; and*

*portions of the ridge means extending generally parallel to the divider portion horizontal surface and lying below the uppermost part of the first trough portion to define a lip for being restingly received on the sink immediately adjacent a sink basin.*

* * * * *